Sept. 29, 1964 T. E. ELLIS ETAL 3,151,219

TONE DETECTING CIRCUITRY

Filed July 28, 1959 3 Sheets-Sheet 1

INVENTOR.
THOMAS E. ELLIS
ADAM A. JORGENSEN

BY F. H. Henson

ATTORNEY

Sept. 29, 1964 T. E. ELLIS ETAL 3,151,219

TONE DETECTING CIRCUITRY

Filed July 28, 1959 3 Sheets-Sheet 2

United States Patent Office 3,151,219
Patented Sept. 29, 1964

3,151,219

TONE DETECTING CIRCUITRY

Thomas E. Ellis, Rochester, and Adam A. Jorgensen, Victor, N.Y., assignors to General Dynamics Corporation, Rochester, N.Y., a corporation of Delaware Filed July 28, 1959, Ser. No. 830,025
6 Claims. (Cl. 179—18)

Figure 1:
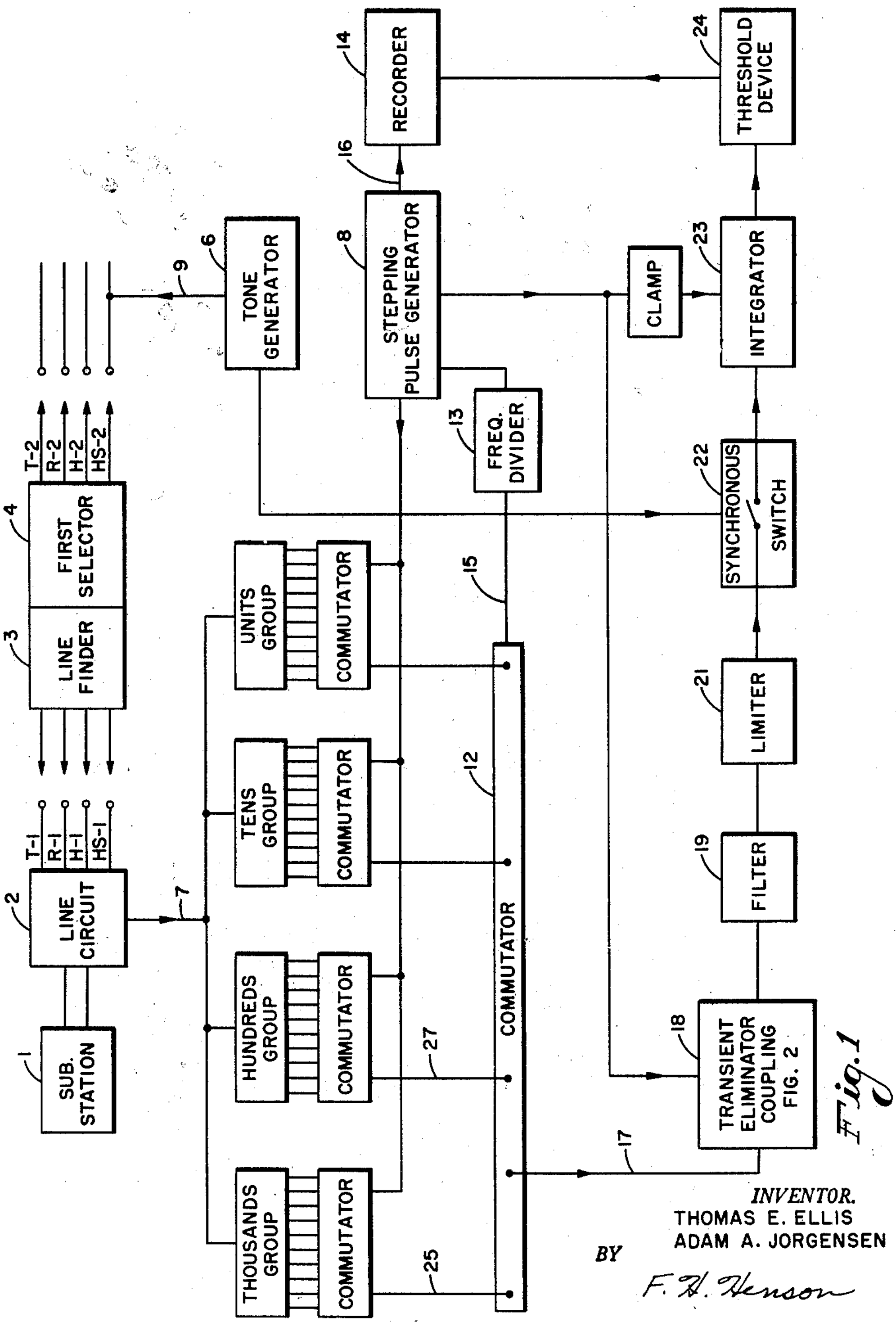

The present invention relates to tone detecting circuitry.

It has become desirable in the telephone field to identify the calling party for automatic billing purposes by wiring a sleeve lead located within a line circuit associated with the calling party to one conductor of each of a plurality of groups of conductors which make up a calling party identification matrix. Each group is scanned by a commutator coupled to a tone detector which in turn is coupled to the input circuit of a recording device. A calling party identifying tone is applied to the sleeve lead upon the initiation of a call by the calling party and, as a result, the appropriate matrix conductors are marked by the tone. The recording medium is moved in step with the commutators so that a mark is made on the recording medium when a particular commutator is in contact with a conductor having the identifying tone impressed thereon. The positions of the marks on the recording medium thus indicate which conductors in each group are marked by the tone. A great deal of spurious noise is introduced into the input circuit of the tone detector and as a result it is extremely difficult for the detector to detect the presence of the identifying tone submerged in the noise signals which often have as much as ten times the peak amplitude of the identifying tone. An additional problem is introduced by the differing D.C. potentials existing upon the various conductors of the matrix, which are caused by D.C. feedback within the matrix and by changing traffic conditions. These differences cause transient signals to be set up in the input circuit of the detector when the commutator brush initially contacts a conductor carrying a different D.C. potential than the previous conductor contacted by the brush. This action introduces additional spurious signals to the detector and prevents utilization of the entire scanning period assigned to each conductor which may be a serious handicap where rapid scanning is desired.

Accordingly, it is a principal object of the present invention to provide improved tone detecting circuitry capabale of detecting the presence of a particular tone which may be submerged in noise signals having many times the peak amplitude of the tone to be detected.

It is a further object of the present invention to provide tone detecting circuitry which scans a plurality of conductors forming part of a matrix at a rapid rate and which produces output pulses during the time intervals when the commutator brushes are in contact with those conductors having the marking tone impressed thereon, although substantial differences in D.C. potential exist between the various conductors.

It is a feature of the present invention to provide for a synchronous switch coupled to the input circuit of a tone detecting integrator, the switch being closed during positive half cycles of the tone to be detected and opened during negative half cycles of the tone to be detected so that sufficient energy to operate a threshold device coupled to the integrator will be accumulated in the integrator when the identifying tone is transmitted to the detector, and so that insufficient energy to operate the threshold device will be accumulated by a spurious signal having a phase difference with respect to the cyclic opening and closing of the gate.

It is a further feature of the present invention to provide a limiter-amplifier to be inserted before the synchronous switch so that spurious signals which have been limited and have passed through the synchronous switch cannot introduce sufficient energy into the integrator to actuate the threshold device by means of having high amplitude peaks.

It is yet a further feature of the present invention to provide capacitive coupling between the output circuit of a tone detecting commutator which scans a plurality of conductors having various D.C. potentials impressed thereon, and the input circuit of tone detecting circuitry, and means for charging and discharging the capacitor after each step taken by the commutator so that transients, which would otherwise be set up in the input circuit of the tone detector due to the change of D.C. potential from one conductor to the next, are eliminated.

Further objects, features and advantages of the present invention will become apparent as the following description proceeds and the features of novelty which characterize the invention will be pointed out with particularity in the claims annexed to and forming a part of this specification.

Figure 2:
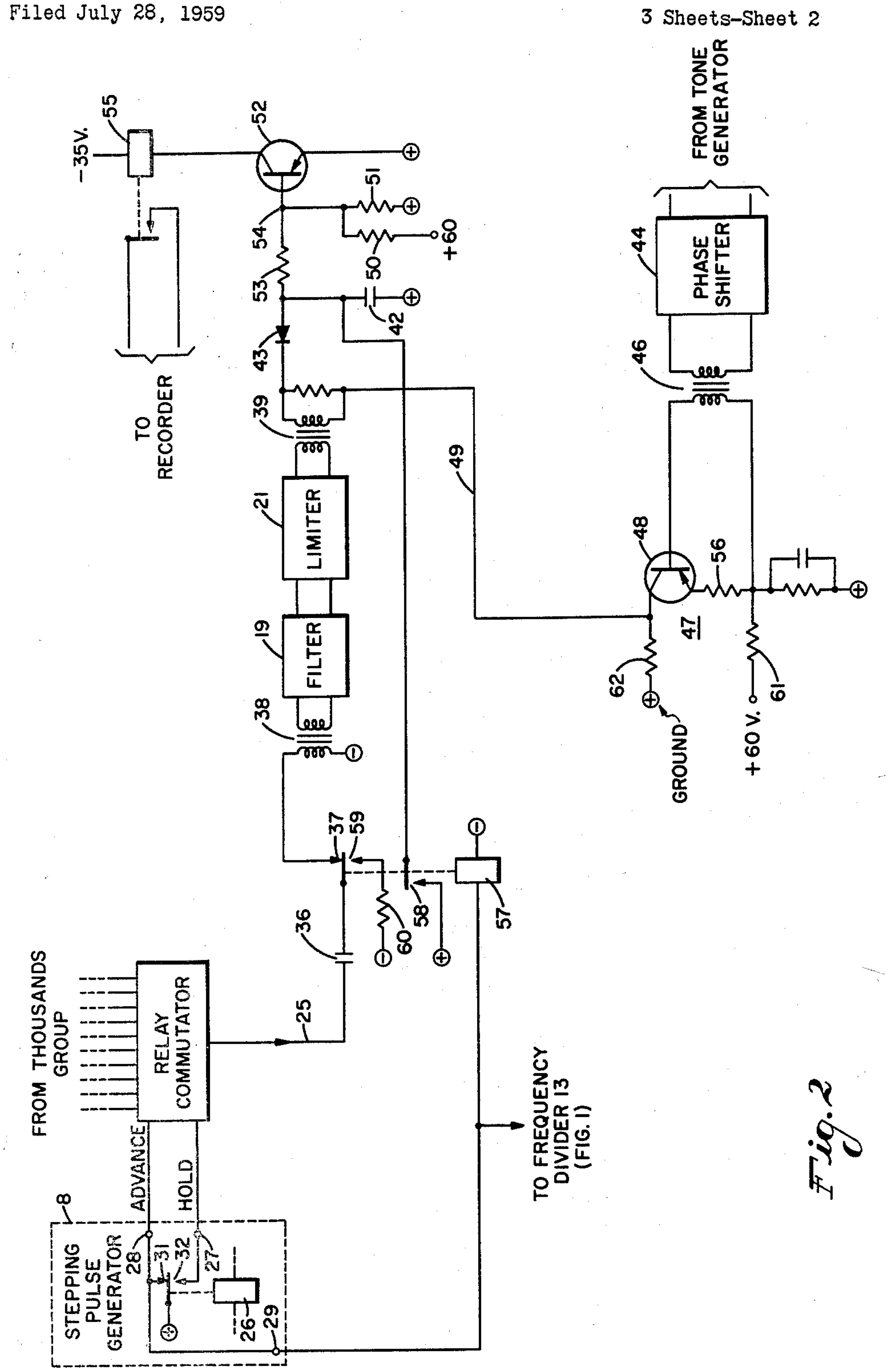
Figure 4:
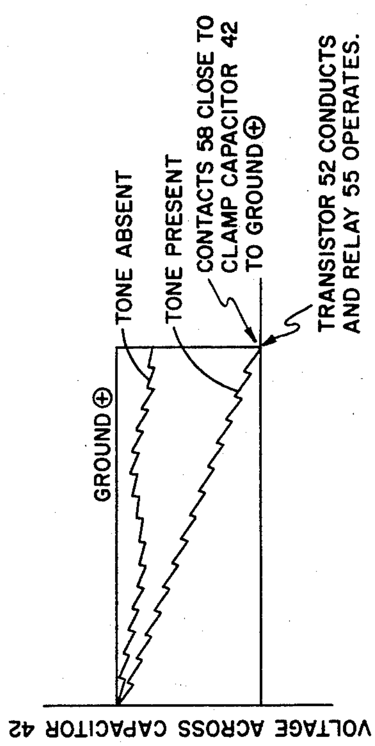
Figure 3:
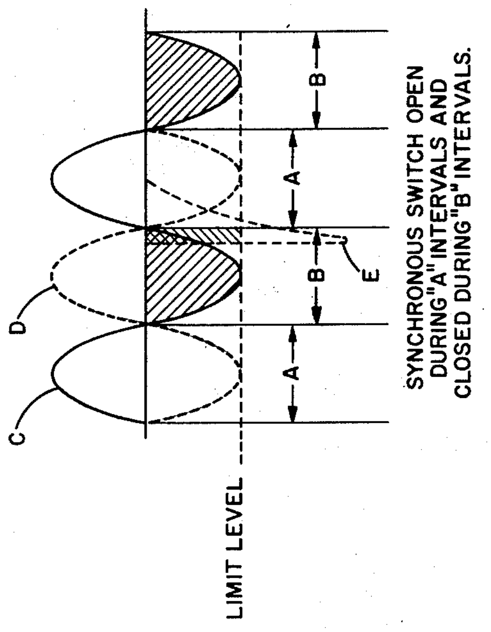

For a better understanding of the present invention, reference may be had to the accompanying drawings of which:

FIG. 1 discloses a schematic diagram of the environment in which the present invention may be practiced;

FIG. 2 discloses a detailed drawing of the features of the present invention;

FIGS. 3 and 4 disclose pulse diagrams which will be helpful in the understanding of the present invention.

Referring now to FIG. 1 of the drawings, subscriber station 1 of a calling party is shown coupled to line circuit 2 in the conventional manner. The calling party dials the number of the called party and a switch train is set up in the usual manner. Line finder 3 and first selector 4 which make up part of this switch train are disclosed. A calling party identification matrix is shown which comprises four groups of ten conductors each. A commutator is associated with each of the aforementioned groups of conductors; these commutators being utilized to scan the conductors. When the calling party identification process commences, tone generator 6 produces a sinusoidal or other alternating signal on lead 9 which passes through the switch train and is impressed through line circuit 2 on lead 7. Lead 7 is coupled to one conductor in each group of conductors so that the tone produced by tone generator 6 will be present upon one of ten of the conductors in each group. For instance, if the number associated with subscriber station 1 is 2228, the second conductor in the thousands, hundreds and tens groups will be coupled to lead 7 and the eighth conductor of the units group will be coupled to lead 7. Stepping pulse generator 8, which may be of any well known type, produces a train of pulses which step each commutator associated with each group of conductors. Commutator 12 is coupled to an output circuit of stepping pulse generator 8 through a frequency divider 13 which produces a pulse on lead 15 for every ten pulses produced by stepping pulse generator 8. It is thus apparent that the four groups of conductors are sequentially scanned by the five commutators disclosed in FIG. 1. Obviously one commutator could be used to scan all four groups of conductors, if desired. Recorder 14 contains a moving recording medium which is stepped in synchronism with the commutators associated with each group of conductors so that a series of marks may be made on the medium. The pulses produced by stepping pulse generator 8 actuate the mechanism utilized to step the moving recording medium over lead 16. Output lead 17 of commutator 12 is coupled to the marking circuitry of recorder 14 through transient eliminator coupling 18, filter 19, limiter-amolifier 21, synchronism switch 22, integrator 23 and threshold device 24 whose functions are to be explained hereinafter.

Again assuming that the number of subscriber station 1 is 2228, the commutator associated with the thousands group will produce the tone generated by tone generator 6 on its output lead 25 only when the commutator brush is in contact with the second conductor of the thousands group. Since lead 25 is coupled to the output lead 17 of commutator 12 at this time, the tone will pass through the coupling unit 18, filter 19, limiter-amplifier 21, synchronous switch 22, integrator 23 and will trigger threshold device 24 which action in turn causes a mark to be made on the "number two" position of the moving recording medium. The tenth pulse produced by stepping pulse generator 8 causes a pulse to be produced by frequency divider 13 which in turn causes commutator 12 to step thereby coupling output lead 27 of the commutator associated with the hundreds group to lead 17 and the process is repeated. It therefore should be apparent that marks are made on the moving recording medium at positions corresponding to the particular conductor in each group marked by the identifying tone, thereby to record the identity of the calling party. The explanation of the recorder operation was considerably simplified since this aspect of the calling party identification process forms no part of the present invention and was included merely for background.

Referring now to FIG. 2, which discloses detailed embodiments of the features of the present invention, the stepping pulse generator 8 is disclosed schematically. Relay 26 is energized and deenergized periodically by any conventional pulse generating circuitry which forms no part of the present invention and hence is not disclosed. The commutators disclosed in FIG. 1 may, if desired, be relay counting chains of any standard design, these chains functioning as commutators. The "advance" and "hold" leads of these commutators are coupled to output terminals 27 and 28 of pulse generator 8 as shown in the drawing. Upon the periodic deenergization of relay 26, contacts 31 are closed thereby to cause each commutator to step. A short time thereafter, relay 26 again becomes energized to reopen contacts 31 and close contacts 32 thereby to maintain the commutators in their present condition. After an interval, contacts 31 are again closed and contacts 32 are reopened and the commutators are again stepped to couple the next succeeding conductor in each group to the output lead of each relay commutator. In FIG. 2, only that commutator associated with the thousands group of conductors is disclosed but it should be understood that the advance and hold leads of each commutator disclosed in FIG. 1, except commutator 12, are connected to terminals 27 and 28 of stepping pulse generator 8.

Let us now assume that contacts 32 of stepping pulse generator 8 are closed and that the first conductor in the thousands group is coupled to output lead 25 of the thousands group relay commutator. If the identifying tone produced by tone generator 6 is present on the first conductor of the thousands group, the tone will be introduced into filter 19 through coupling capacitor 36, contacts 37 and transformer 38. Filter 19 may be any standard filtering arrangement which attenuates 60 cycles per second frequencies and accentuates 200 cycles per second signals. Because the identifying tone has a frequency of 200 cycles per second, it is desirable to accentuate signals passing through the filter having this frequency and since a great deal of 60 cycle noise is introduced in the system, it is also desirable to attenuate signals having this frequency. Signals are transmitted from the output of filter 19 into the input winding of coupling transformer 39 through conventional limiter-amplifier 21 for reasons to be explained hereinafter. See "Pulse Techniques," U. S. Army Technical Manual TM11–672 for an example of such an amplifier.

The secondary winding of transformer 39 is coupled to integrating capacitor 42 through diode 43 which forms part of the synchronous switch disclosed in FIG. 1. Capacitor 42 is coupled to the input circuit of transistor 52 for the purpose of controlling the operation of relay 55 which is connected in the emitter-collector circuit of the transistor. Phase shifter 44, coupling transformer 46, and transistorized amplifier 47 together with diode 43 make up the synchronous switch. The input circuit of phase shafter 44 is coupled to the tone generator so that the identifying tone produced by tone generator 6 controls amplifier 47 through the coupling transformer 46 and phase shifter 44.

Reference will now be had to FIG. 3 taken in conjunction with the circuitry disclosed in FIGS. 1 and 2. The identifying tone produced by tone generator 6 is applied to the input circuit of transistorized amplifier 47 through phase shifter 44 and coupling transformer 46 and is represented by waveform D disclosed in FIG. 3. When waveform D becomes positive with respect to ground, transistor 48 is cut off so that the potential on lead 49 becomes slightly positive with respect to ground. Current flows through resistor 50, resistor 51, resistor 53, forward-biased diode 43, the secondary winding of coupling transformer 39, lead 49 and resistor 62 to ground (+) which action causes lead 49 to have a potential positive with respect to ground (+). Under this condition, which occurs during the intervals labeled B in FIG. 3, diode 43 is forward-biased and negative-going signals produced across the secondary winding of transformer 39 cause a negative charge to be introduced into integrating capacitor 42 through forward-biased diode 43. Positive going signals will back-bias the diode and thus not affect the charge in the capacitor. When the base of transistor 48 becomes negative with respect to the emitter, that is when waveform D is negative-going, considerable current flows from the 60 volt terminal through resistor 61, resistor 56, the emitter-collector circuit of transistor 48 and resistor 62 to ground (+). During these intervals, labeled A in FIG. 3, the potential on lead 49 rises to approximately 45 volts positive with respect to ground and diode 43 becomes back-biased to the extent that negative-going signals produced across the secondary winding of transformer 39 cannot pass through the diode and hence negative charges cannot be introduced into integrating capacitor 42.

Now assuming that the first conductor of the thousands group is coupled to output lead 25 through the relay commutator and that the identifying tone is present on this conductor, this tone will pass through coupling capacitor 36, closed contacts 37, transformer 38, filter 19 and will be inverted by limiter 21 so that the signal produced across the secondary winding of transformer 39 will be 180 degrees out of phase with the tone produced across the input circuit of transistorized amplifier 47. Waveform C in FIG. 3 represents the signal across the secondary winding of transformer 39 when the identifying tone has been detected. During intervals A disclosed in FIG. 3, when diode 43 is back-biased, capacitor 42 tends to become charged in a positive direction through resistor 53, resistor 51 and resistor 50. During the intervals labeled B in FIG. 3, when diode 43 becomes forward-biased, the tone impressed across the secondary winding of coupling transformer 39 is negative-going and accordingly a considerable negative charge is introduced into integrating capacitor 42 through forward-biased diode 43. This negative charge introduced by the negative half cycle of waveform C is considerably greater than the positive charge introduced into the integrating capacitor 42 through resistor 53 when diode 43 is back-biased during the A intervals. As a result, if the genuine identifying tone is being introduced through the detection circuitry, the net charge stored in capacitor 42 will increase until the base of transistor 52 becomes negative with respect to the emitter and relay 55 becomes actuated. This action is shown in FIG. 4.

If the identifying tone is not being introduced into the detection circuitry, negative-going noise signals produced across the secondary winding of transformer 39 will be unable to introduce sufficient energy into integrating capacitor 42 to cause the net charge to increase in a negative direction. This is partially true because half of the random noise signals will be produced across the secondary winding of transformer 39 during the A intervals when the synchronous switch is open according to the laws of probability. In addition, the limiting action of limiter 21 prevents a great deal of the energy associated with these noise pulses from passing to the coupling transformer 39. The limiting level is selected so that all the energy associated with the genuine tone passes through limiter 21 but that little energy of noise signals of short duration and of great peak amplitude passes through limiter 21, and this is the type of noise signal for the most part introduced into the matrix. A typical noise pulse is represented by waveform E in FIG. 3. In practice, waveform E will have a shorter duration and will have a far greater peak amplitude than shown in the figure but these dimensions have been altered for the sake of expediency. The shaded portion of waveform C represents the amount of energy during each B interval which passes through diode 43. The shaded area under waveform E represents the amount of energy associated with this spurious noise pulse which will pass through diode 43. It should be apparent that this amount of energy is small compared to the energy introduced into the integrating capacitor 42 by waveform C.

In summary, the limiting action of limiter 21 and the action of the synchronous switch which passes energy associated with negative-going signals only during the B intervals, together make it possible to detect an identifying tone which is virtually buried in a great many noise signals having very high peak amplitudes and having very short durations.

Because of some phase shift introduced in filter 19 and limiter-amplifier 21, it was necessary to utilize a phase shifting network represented by block 44, FIG. 2, to maintain waveforms C and D of FIG. 3 exactly 180 degrees out of phase. Of course, any conventional circuit for shifting the phase of a fluctuating signal may be utilized.

After the tone detecting interval is over, relay 26 of stepping pulse generator 8 releases thereby to close contacts 31 which in turn causes the commutators to step. The closure of contacts 31 also causes the energization of relay 57 which in turn causes integrating capacitor 42 to become short-circuited through contacts 58. This clamping action prepares integrating capacitor 42 for the next detection process similar to the one described hereinbefore. Contacts 31 remain closed for a period of approximately three milliseconds after second conductor is coupled to commutator output lead 25. As mentioned previously, the D.C. potentials on the various conductors within each group of conductors making up the identifying matrix may vary considerably and if coupling capacitor 36 is permanently connected to the primary winding of transformer 38, coupling capacitor 36 would charge and discharge through the primary winding of transformer 38 thereby to shock the series resonant circuit comprising capacitor 36 and the primary winding of transformer 38 into oscillation. Until the resulting transient signal dies out, the detector is incapacitated. This is undesirable since scanning is to occur rapidly and the full scanning period allocated to each conductor must be used. In addition, the transient signal might cause the activation of relay 55. Accordingly, upon the closure of contacts 31 which occurs during the stepping operation, relay 57 is energized and contacts 59 are closed and remain closed for approximately three milliseconds after the second conductor in the thousands group becomes coupled to commutator outlet lead 25 and, in this three millisecond period, coupling capacitor 36 becomes charged or discharged through resistor 60 depending upon whether the D.C. potential impressed upon the second conductor is greater or less than the D.C. potential impressed upon the first conductor. After this three millisecond period, relay 26 becomes deenergized, relay 57 becomes deenergized and contacts 37 are closed thereby to couple the second conductor to the primary winding of transformer 38 through capacitor 36. Since equilibrium was reached during the operation of contacts 59 no undesirable transient signal is introduced into the detection circuitry.

It should be understood that the tone produced by tone generator 6 may be a series of negative-going rectangular pulses or almost any other type rather than the sinusoidal A.C. signal disclosed in FIG. 3.

While I have shown and described a specific embodiment of my invention, other modifications will readily occur to those skilled in the art. I do not therefore desire my invention to be limited to the specific arrangement shown and described, and I intend in the appended claims to cover all modifications within the spirit and scope of my invention.

What is claimed is:

1. In a tone detecting and amplifying circuit, an indicating device having a first and second input terminal and which assumes a first state when a signal applied across said input terminals falls below a predetermined threshold value and which assumes a second state when a signal applied across said input terminals rises above a predetermined threshold value, an integrating circuit including a storage device connected across the input terminals of said indicating device, means having an input and output circuit for producing a fluctuating output signal in said output circuit in response to the application of a fluctuating input signal to said input circuit, a tone generator for producing a fluctuating signal having a frequency $f$, means for coupling the output signals of said tone generator to the input circuit of said means for producing a fluctuating output signal at certain times, a switch for coupling the output circuit of said means for producing a fluctuating output signal to the input circuit of said integrating means for changing the impedance of said switch $f/N$ times a second, N being an integer, in synchronism with fluctuations of the signal produced by said tone generator so that the charge in said storage device changes sufficiently to cause said indicating device to change its state when the output of said tone generator is coupled to the input circuit of said means for producing a fluctuating output signal.

2. In combination, a plurality of conductors having various values of D.C. potential on various ones of said conductors, a tone generator for producing a fluctuating signal having a frequency $f$, means for connecting said tone generator to one or more of said plurality of conductors at certain times, a commutator having an output circuit for sequentially coupling said conductors to said output circuit means for stepping said commutator, means for detecting the tone produced by said tone generator having an input circuit, a capacitor for coupling the output circuit of said commutator to the input circuit of said means for detecting, means operative for a short interval after said commutator is stepped for charging or discharging said capacitor depending upon the change in D.C. potential from one conductor to the next, thereby to prevent transients caused by said change from temporarily disabling said means for detecting, said means for detecting further including an indicating device having a first and second input terminal and which assumes a first state when a signal applied across said input terminals falls below a predetermined threshold value and which assumes a second state when a signal applied across said input terminals rises above a predetermined threshold value, said means for detecting further including an integrating circuit connected across the input terminals of said indicating device, a switch having an input circuit, output circuit and control circuit, means for coupling the input circuit of said switch to the input circuit of said means for detecting, means for coupling the output circuit of said switch to the input circuit of said integrating circuit, and means for changing the impedance of said switch $f/N$ times a second, N being an integer, in synchronism with fluctuations of the signal produced by said tone generator.

3. In combination, a tone generator having an output circuit, an integrator having an input and output circuit, a switch having an input circuit, an output circuit and a control circuit, means for coupling the output circuit of said tone generator to the control circuit of said switch so that said switch is cyclically opened and closed by fluctuations of the tone produced by said tone generator, means for coupling the output circuit of said switch to the input circuit of said integrator, means for transmitting the tone produced by said tone generator to the input circuit of said switch at certain times and indicating means coupled to the output circuit of said integrator for indicating the condition of said integrator and hence the presence or absence of the tone at the input circuit of said switch.

4. The combination as set forth in claim 3 wherein a limiter is included between said transmission means and the input circuit of said integrator.

5. In combination, a tone generator having an output circuit, an integrator having an input and output circuit, a switch having an input circuit, an output circuit and a control circuit, means for coupling the output circuit of said tone generator to the control circuit of said switch so that said switch is cyclically opened and closed by fluctuations of the tone produced by said tone generator, indicating means coupled to the output circuit of said integrator for indicating the condition of said integrator, means for connecting the output circuit of said switch to the input circuit of said integrator, a plurality of conductors having various values of D.C. voltage impressed thereon, means for coupling the output circuit of said tone generator to one or more of said conductors at certain times, a commutator having an output circuit for sequentially coupling said conductors to its output circuit, a capacitor for coupling the output circuit of said commutator to the input circuit of said switch and means operative for a short interval after said commutator is stepped for charging or discharging said capacitor depending upon the change in D.C. potential from one conductor to the next.

6. The combination as set forth in claim 5 wherein a limiter is inserted between the output circuit of said commutator and the input circuit of said switch.

References Cited in the file of this patent

UNITED STATES PATENTS

| | | |
|---|---|---|
| 2,669,607 | Pharis | Feb. 16, 1954 |
| 2,699,464 | Di Toro et al. | Jan. 11, 1955 |
| 2,876,282 | Callaway | Mar. 3, 1959 |
| 2,894,072 | Abbott et al. | July 7, 1959 |
| 2,924,666 | Brooks et al. | Feb. 9, 1960 |
| 2,947,819 | Brightman et al. | Aug. 8, 1960 |
| 3,061,685 | Peach | Oct. 30, 1962 |

OTHER REFERENCES

Ives: "Music Pulse Analyzer Rejects Voice Signals," Electronics, April 1, 1957 (pp. 183–185 relied upon).